Patented Feb. 18, 1947

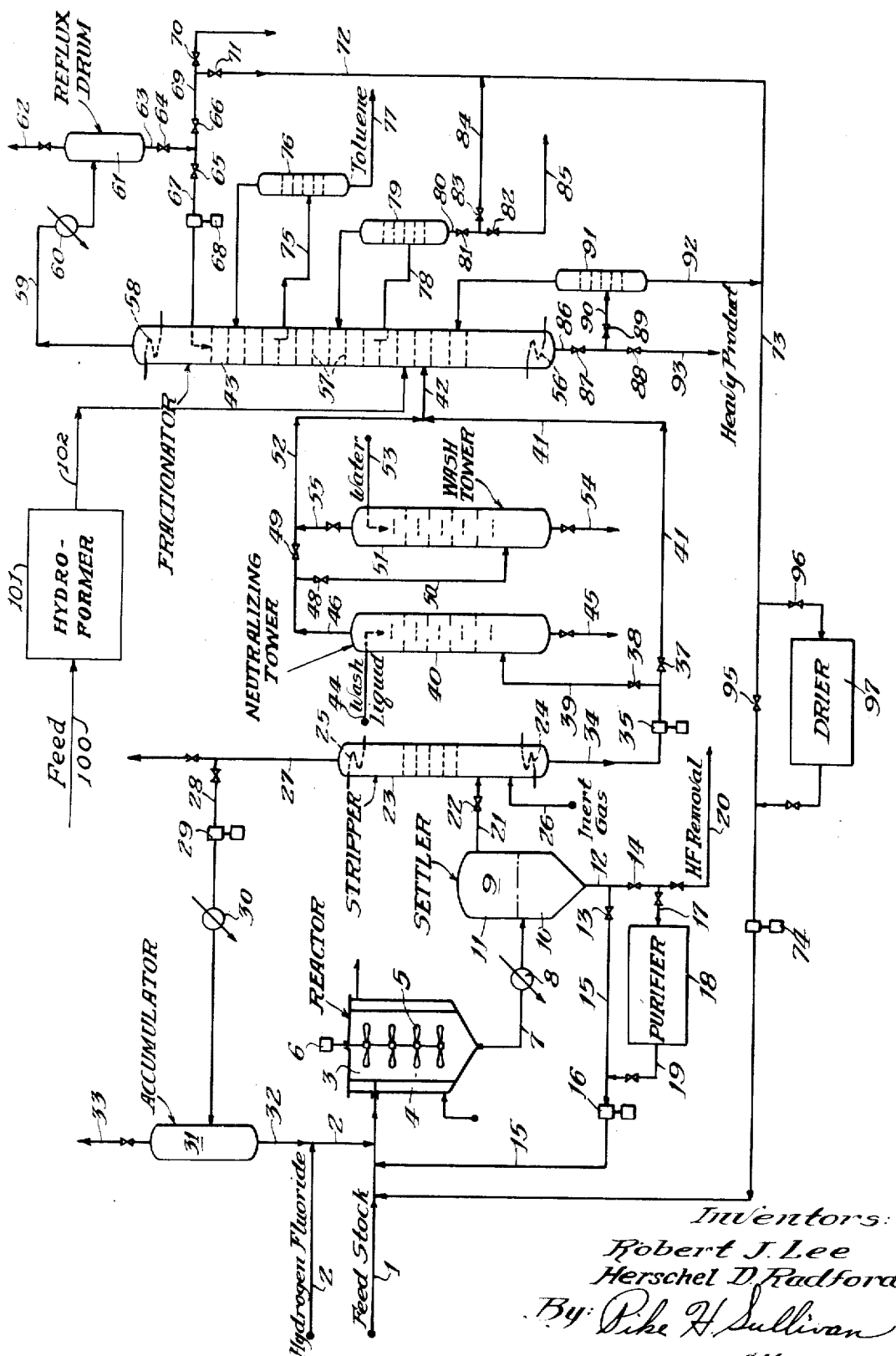

2,416,184

UNITED STATES PATENT OFFICE 2,416,184

CONVERSION OF HYDROCARBONS

Robert J. Lee, La Marque, and Herschel D. Radford, Texas City, Tex., assignors to Pan American Refining Corporation, New York, N. Y., a corporation of Delaware Application March 29, 1943, Serial No. 480,912

16 Claims. (Cl. 260—671)

This invention relates to the conversion of hydrocarbons. More particularly, it relates to the preparation of hydrocarbon substituted aromatic hydrocarbons by a process of catalytic disproportionation.

It is an object of this invention to produce commercially valuable alkyl aromatic hydrocarbons. Another object of this invention is the preparation of alkyl substituted aromatic hydrocarbons which are particularly valuable in the preparation of explosives, high octane number aviation gasolines and synthetic rubber. Another object of this invention is the preparation of methyl benzenes, particularly toluene, from polymethylated benzenes by an economical process of catalytic disproportionation. Still another object of this invention is to produce valuable alkyl aromatic hydrocarbons from petroleum hydrocarbon mixtures.

An additional object of this invention is to provide an improved method of disproportionation and a novel and efficient catalyst therefor. Previously known catalysts for the disproportionation of alkyl aromatic hydrocarbons have been characterized by their undesirable action in simultaneously catalyzing reactions leading to the production of copious amounts of tar. By the use of our catalyst, clean and tar-free disproportionation reactions are induced.

A further object of this invention is to provide an improved method for the preparation of hydrocarbon substituted aromatic hydrocarbons by a process of catalytic rearrangement or isomerization, which may or may not accompany, or be accompanied by, disproportionation. By way of example, aromatic hydrocarbon molecules containing two nuclear alkyl substituents in either the ortho, para, or meta positions may be treated by our process to produce a mixture of aromatic hydrocarbon molecules, some of which contain two nuclear alkyl substituents. Those containing the two nuclear alkyl substituents may be ortho, meta or para isomers or a mixture of any or all, depending on the original charge.

The alkyl group may or may not have undergone rearrangement within itself during the isomerization of the hydrocarbon substituted aromatic hydrocarbon depending on the original type of alkyl group.

We have found that alkyl aromatic hydrocarbons may be disproportionated into higher and lower boiling alkyl aromatic hydrocarbons by contacting them with liquid hydrogen fluoride. By the term "disproportionation" we intend to denote a process wherein alkyl groups are caused to be transferred from nuclear carbon atoms in one aromatic molecule to nuclear carbon atoms in another aromatic molecule. By way of example, aromatic hydrocarbon molecules containing two nuclear alkyl substituents may be treated by our process to produce aromatic hydrocarbon molecules containing one and three nuclear alkyl substituents respectively, as expressed by the following equation:

$$2ArR_2 = ArR + ArR_3$$

wherein Ar is an aryl radical and R is a nuclear alkyl substituent.

We have also found that the disproportionation of alkyl aromatic hydrocarbons having the general formular $ArR_n$ (wherein Ar represents an aryl radical, R represents an alkyl radical substituted on a nuclear carbon atom and $n$ is at least 1), is facilitated by the presence of other aromatic hydrocarbons and/or alkyl aromatic hydrocarbons having the general formula $ArR_{n-x}$ (wherein Ar represents an aryl radical, R represents a nuclear alkyl substituent, $n$ is at least 1 and $x$ is less than $n$).

By our use of the term "disproportionation," we intend also to include processes of destructive disproportionation. In destructive disproportionation, an alkyl substituted aromatic hydrocarbon molecule, wherein the alkyl group contains at least 2 and preferably 4 or more carbon atoms, undergoes C—C scission at some point along one or more of the alkyl chains, resulting in the production of active alkyl radicals which unite with nuclear carbon atoms in the same or different aromatic hydrocarbon molecules.

Briefly, our invention comprises contacting alkyl substituted aromatic hydrocarbons, either alone or in hydrocarbon mixtures, for example in mixtures with other aromatic hydrocarbons which may or may not contain nuclear alkyl substituents, with liquid hydrogen fluoride under conditions conducive to the transfer of alkyl radicals from nuclear carbon atoms in one aromatic molecule to other nuclear carbon atoms in other aromatic molecules. The transfer of alkyl radicals may usually be effected by agitating the feed stock with liquid hydrogen fluoride at temperatures, preferably in the range of about 150° F. to 400° F., and under sufficient pressure to maintain the reactants in liquid phase. Pressures of 100 to 1500 pounds per square inch ordinarily are employed. After the reaction has proceeded to the desired extent, the reaction mixture is treated, e. g., by distillation or by cooling and stratifying, to separate the catalyst, which may be recycled to the disproportionation process with or without preliminary purification. The desired hydrocarbon products are then separated, e. g., by distillation, and unreacted feed stock and/or heavy ends may be recycled to the disproportionation process.

Aromatic hydrocarbons which are useful as components of feed stocks in the present invention include xylenes, trimethyl benzenes, and higher polymethyl benzenes; ethyl, diethyl and polyethyl benzenes; ethyl toluene; propyl, isopropyl, and polyisopropyl benzenes; mono- and dimethyl-naphthalenes, higher methyl naphthalenes; ethyl-, propyl-, butyl-, amyl-, hexyl- and octyl-naphthalenes; mono-, di- and higher alkyl anthracenes and acenaphthenes and the like. In general, we may use any alkyl substituted mono- or polycyclic aromatic hydrocarbon feed stock, either in the pure form or in mixtures, particularly such mixtures as are normally produced in petroleum refining or conversion operations.

The above and other alkyl aromatic hydrocarbons are found in various proportions in one or more of the following: coal tar solvent naphthas, naphthas produced by catalytic hydrogenation, catalytic reforming processes and especially catalytic hydroforming or aromatization processes, refractory gas oils produced by recycling cracking operations, cracked tars and in the solvent extracts which may be produced by treatment of the above and similar feed stocks in liquid phase or by extractive distillation with selective solvents such as nitromethane, nitrobenzene, phenol, furfural, B-B'-dichloroethyl ether (Chlorex), liquid sulfur dioxide and the like. Alkyl aromatic hydrocarbons suitable as feed stocks in our invention may also be readily produced by the alkylation of aromatics with olefins, alkyl halides, ethers, esters or alcohols, using catalysts such as sulfuric, phosphoric and hydrofluoric acids, active metal halides and the like.

By the process of our invention, alkyl aromatic hydrocarbons, particularly those containing two or more nuclear alkyl substituents may be catalytically disproportionated into valuable hydrocarbons such as toluene, ethyl benzene and isopropyl benzene, which have found extensive application in the preparation of explosives, high octane number gasolines and synthetic rubber. In contrast, the feed stocks from which we may produce the above and similar hydrocarbons have found little or only limited use in industry and are generally considered to be less desirable by-products since they cannot be readily cracked to produce motor fuels, solvents and the like.

Although we prefer to use substantially anhydrous liquid hydrogen fluoride as the catalyst, we may use aqueous solutions of hydrogen fluoride containing as much as 25 weight percent of water. In general, water tends to reduce the catalytic activity of hydrogen fluoride and to produce corrosive solutions. We have found commercial anhydrous hydrogen fluoride to be a satisfactory catalyst; no special precautions were found necessary to protect liquefied commercial hydrogen fluoride from atmospheric moisture in our operations. Commercial hydrogen fluoride may contain about 0.5% water, the average being 0.1 to 0.2%.

We prefer to use high catalyst-to-feed ratios in the operation of our process. We have found that it is advantageous to use at least 100 percent and preferably 200 percent by weight or more of the catalyst, based on the weight of the aromatic hydrocarbon feed stock present in the reaction zone. The optimum ratio of catalyst-to-feed stock will vary with the nature of the specific feed stock, the intimacy of contact, and the products sought.

The temperature and pressure to be used will vary with the nature of the feed stocks, proportion of catalyst and the nature of the products sought. In order to facilitate rapid reaction, we prefer to use reaction temperatures above about 200° F. Temperatures in the range of about 150° F. to 360° F. are generally suitable for the disproportionation of alkyl aromatics in the presence of liquid hydrogen fluoride.

We prefer to maintain sufficient pressure on the reaction system so that the reactants are in the liquid phase. The use of a liquid phase reaction system reduces pumping and storage costs, and facilitates the contacting of the reactants with the catalyst. When temperatures in the range of about 280 to 300° F. are used, the pressure can be maintained at about 300 to 550 pounds per square inch.

In order to facilitate homogeneous and rapid reaction and to reduce catalyst requirements, it is advantageous to agitate the catalyst and reactants vigorously. The agitation may be effected by any of the numerous well known means such as shaking, by the use of turbo mixers, orifice mixers, by pumping the reactants rapidly in a closed cycle, injecting inert gases into the liquid reaction system and the like. Agitation may likewise be effected by circulating the reaction mixture through baffled or packed towers or tubes containing chips or shavings of copper, chrome steels, nickel and the like.

Our invention may be operated as a continuous, semi-continuous or batch process. These methods of carrying out conversion processes are well known in the art and need not be described in detail here. The process may be effected in autoclaves, high pressure bubble towers, or continuous tubular reactors. The disproportionation process may be effected on a recycling basis or in a number of interconnected stages.

The method of charging the reactants to the conversion equipment may vary, depending upon the nature of the starting materials. Thus, one or more of the feed stocks may be dissolved in, or mixed with, the liquid hydrogen fluoride and charged to the conversion equipment, or the reactants and catalyst may be separately charged, or one reactant may be charged into a body of liquid hydrogen fluoride and another hydrocarbon reactant.

Upon completion of the desired disproportionation, the hydrogen fluoride may be separated from the hydrocarbon reactants and reaction products by distillation, stratification, or extraction processes. In general, we have found it expedient to separate the hydrogen fluoride by stratification and to reuse it in our disproportionation process. In another method of operating, we may add ice, water, caustic, aqueous sodium carbonate, alcohols, ammonia and the like to the reaction mixture in order to remove the hydrogen fluoride.

After separation of the hydrogen fluoride, the hydrocarbons present in the reaction mixture may be fractionated to separate the desired product or products and unreacted hydrocarbons or by-products which may be recycled to the disproportionation process.

The conversion equipment may be made of or lined with copper, steel, stainless steel, Monel metal, nickel or platinum. When iron vessels are used, tarry residues are formed that are absent when copper vessels are used for the same reaction.

One specific embodiment of our invention comprises the contacting of low and high boiling hydroformates to produce increased yields of aviation gasoline blending stocks, particularly toluene, xylene, pseudocumene and mesitylene. By the term "hydroformate" we intend to denote gasolines and naphthas produced by catalytic hydroforming processes. Briefly, catalytic hydroforming may be described as a process for the aromatization of aliphatic, and cycloaliphatic hydrocarbons. Usually a straight run or cracked naphtha or other hydrocarbon mixture containing at least about 35% of paraffin hydrocarbons having 6 to 14 carbon atoms is contacted in the vapor phase with a dehydrocyclization catalyst such as metal oxides of groups IV, V and VI of the periodic table, preferably supported by an active alumina in the initial presence of about 0.4 to 8 mols of hydrogen per mol of charging stock at a temperature between 875 and 1075° F., a pressure between about 30 and about 450 pounds per square inch, and a reciprocal space velocity in the range of 0.1 to 25 hours. The hydroforming process produces a variety of aromatic hydrocarbons, depending upon the specific feed stock and reaction conditions, including benzene, alkyl benzenes, polycyclic aromatic hydrocarbons, and alkyl (particularly polymethyl) polycyclic aromatic hydrocarbons. By efficient fractionation, hydroformate may be separated into fractions suitable for use in our invention.

In order to increase the yield of aviation gasoline blending stocks from products produced by hydroforming, we may disproportionate mixtures of polyalkyl aromatic hydrocarbon fractions with benzene, e. g., fractions containing principally trimethyl benzenes and polyalkyl substituted aromatic hydrocarbons, by contacting them with liquid hydrogen fluoride at temperatures preferably in the range 280° to 360° F., for example about 300° F., and sufficient pressure to maintain liquid phase. As a result, alkyl groups are transferred to the benzene to form, inter alia, toluene, ethylbenzene and xylenes. In this manner, benzene, which has an undesirably high freezing point for aviation gasoline, and the aromatics boiling above the aviation gasoline range are both converted into valuable aviation gasoline blending stocks.

A specific embodiment of our invention as applied to hydroformate fractions is illustrated by the drawing. A feed stock containing benzene, and xylene fractions from hydroformates in mol ratios of 0.1 to 10 is passed into line 1 where it is mixed with liquid hydrogen fluoride from line 2, and the mixture is passed into a reactor 3, provided with a temperature regulating jacket 4 and stirrer 5 operated by motor 6. When disproportionation has proceeded to the desired extent, the reaction mixture is removed from reactor 3 through line 7 and cooler 8 and is passed into a settler 9, where a substantial part of the liquid hydrogen fluoride separates as a lower layer 10 and the hydrocarbons form an upper layer 11.

The liquid hydrogen fluoride is withdrawn through line 12 and by proper manipulation of valves 13 and 14, all or part thereof is caused to pass through line 15 and pump 16 back to line 1 and into the reactor 3. Alternatively, all or part of the liquid hydrogen fluoride withdrawn through line 12 may be caused to pass into line 17 to purifier 18. The purifier may be a distillation tower, a sulfuric acid scrubber, or an electrolytic cell operated to reduce the water content of the liquid hydrogen fluoride. From purifier 18, the liquid hydrogen fluoride is passed through valved line 19 and line 15 back to line 1 and reactor 3. Part of the hydrogen fluoride passing through line 17 may be removed from the system through valved line 20.

The hydrocarbons constituting layer 11 in settler 9 are passed through line 21 and pressure-reducing valve 22 into stripper 23, where entrained or dissolved hydrogen fluoride is separated. Stripper 23 is provided with a heating coil 24 and a dephlegmating coil 25. Inert stripping gases such as methane, ethane, propane or fractions containing substantial proportions of these constituents, e. g., natural or cracked gases, may be injected into stripper 23 through line 26 to assist in the removal of hydrogen fluoride from the hydrocarbon products. The vaporized hydrogen fluoride is passed through valved line 27 to line 28, compressor 29, cooler 30 and separating drum 31. Part of the hydrogen fluoride passing overhead from stripper 23 may be vented from the system through line 27. Liquid hydrogen fluoride accumulating in separating drum 31 is passed through line 32, to line 2, and back to line 1 and reactor 3. Stripping gases may be vented from separating drum 31 through valved line 33.

The stripped hydrocarbons leave stripper 23 via line 34 and are forced by pump 35 into the purifying and/or fractionating system. By proper control of valves 37 and 38, all or part of the hydrocarbon products may be passed through line 39 into neutralizing tower 40, or into lines 41 and 42 and fractionator 43. The hydrocarbon products passing into neutralizing tower 40 are washed countercurrently with a neutralizing agent such as aqueous ammonia, caustic or sodium carbonate introduced via line 44 and leaving the neutralizing tower through valved line 45.

The neutralized hydrocarbon products leave the neutralizing tower 40 via line 46 and, by proper operation of valves 48 and 49, may be passed wholly or in part to wash tower 51 via line 50 or to fractionator 43 via lines 52 and 42. In wash tower 51, the hydrocarbon products are washed with a countercurrent spray of water introduced therein via line 53 and removed therefrom via valved line 54. The washed hydrocarbon products leave wash tower 51 via line 55 and pass through lines 52 and 42 into fractionator 43.

Fractionator 43 is provided with a closed heating coil 56, fractionating plates 57 and dephlegmator 58. It may be used for the simultaneous fractionation of hydroformates and disproportionation products. Thus, feed can be passed through line 100 into hydroformer 101 and thence through line 102 to fractionator 43. In the fractionator 43, benzene and lighter hydrocarbons are taken overhead through line 59 and cooler 60 and pass into accumulator drum 61 where liquefied hydrocarbons, principally benzene, are separated. Gases may be vented from accumulator drum 61 through valved line 62. Liquid leaves the accumulator drum 61 via line 63 and valve 64 and part thereof is returned as reflux in fractionator 43 by leaving valves 65 and 66 partly open and pumping the liquid by pump 68 through line 67. Part of the liquid leaving accumulator drum 61 passes through valve 66 into line 69 and all or part thereof may leave the system through valve 70. Preferably, valve 70 is maintained partly open or is closed, so that part of the liquid in line 69 is caused to pass through valve 71 into line 72, and thence to line 73 and pump 74 to line 1 and reactor 3.

A desired hydrocarbon product, e. g., toluene, is removed from fractionator 43 through line 75 and is passed into stripper 76 and removed from the system via line 77.

A hydrocarbon fraction suitable for recycling to the reactor 3, e. g., one containing a substantial proportion of xylenes, is removed from fractionator 43 via line 78 and passed into stripper 79. From stripper 79, the hydrocarbon fraction passes through line 80 and valve 81 and, by suitable control of valves 82 and 83, passes wholly or in part through line 84 to line 72 and thence to reactor 3 via pump 74 and line 1. By suitable adjustment of valves 82 and 83, part of the hydrocarbon fraction may be vented from the system via line 85.

Heavy products, e. g., trimethyl benzenes and the like leave fractionator 43 via line 86 and valve 87, and by proper adjustment of valves 88 and 89 may be caused to flow wholly or in part through line 90 into stripper 91 and thence to reactor 3 via line 92, line 73, pump 74 and line 1. By proper adjustment of valves 88 and 89, all or part of the heavy products may be caused to leave the system via line 93.

We have shown a drying zone 97 connected to line 73 by a by-pass, so that by proper adjustment of valves 95 and 96, all or a portion of the stocks being recycled to the reactor 3 may be treated to reduce or eliminate their moisture content. The drying zone 97 may be of any suitable type well known in the art.

uct from the bottom of fractionator 43 are withdrawn from the system. This heavy product will contain primarily polycyclic aromatics as well as any tars formed in the process.

If ethylbenzene is the desired product, the charging material is preferably a mixture of diethylbenzene and benzene. Since ethyl compounds disproportionate more readily than methyl compounds, lower temperatures may be employed in reactor 3 than when toluene is the desired product. Similarly, diisopropylbenzene, which is a by-product when cumene is manufactured by catalytic alkylation of benzene and propylene, may be converted together with benzene into additional cumene.

It will be appreciated that we have omitted many engineering features from the drawing, e. g., automatic valve controls, liquid level controls, safety lines, tower insulation, pumps, heat exchangers, automatic reflux controls, ratio controllers and recycle lines, in order to simplify our explanation of this specific embodiment of our invention.

The following specfic examples describe the disproportionation of xylene with commercial liquefied hydrogen fluoride and benzene. Liquid hydrogen fluoride was agitated at various temperatures with mixed xylene-benzene feed stock. After the reaction had been allowed to continue for a given length of time, the reaction mixture was cooled and poured onto cracked ice. The hydrocarbon products were neutralized, washed and dried and then fractionated in an efficient column. The results obtained are shown in the following tabulation:

Table

| Example No. | Mol ratio of xylene to benzene | Reaction temp., °F. | Approximate press., p. s. i. | Wt. per cent HF based on hydrocarbon charged | Time of agitation, hours | Hydrocarbon recovery, vol. per cent | Yields (mol per cent) based on xylene charged | |
|---|---|---|---|---|---|---|---|---|
| | | | | | | | Toluene | Trimethylbenzenes |
| 1 | 1 | 32 | 14.7 | 35.8 | 1 | 76.9 | 0 | |
| 2 | 1 | 81 | 14.7 | 10.9 | 1 | 83.3 | 0 | |
| 3 | 1 | 122 | 14.7 | 8.6 | 1 | 79.8 | 0 | |
| 4¹ | 1 | 212 | 14.7 | 41.5 | 1 | 56.8 | 0 | |
| 5 | 1 | 316–345 | ²390 | 8.1 | 3 | 80.7 | 0 | |
| 6 | 1 | 212 | ²175 | 11.5 | 2 | 76.9 | 0 | |
| 7 | 1 | 248 | 455 | 40.0 | 2 | 91.3 | 0 | |
| 8 | 1 | 244 | 420 | 58.0 | 2 | 81.3 | 0 | |
| 9 | 1 | 212 | ²175 | 208 | 23 | 60.8 | 10.3 | |
| 10 | 1 | 244–252 | 405 | 216 | 2 | 68.4 | 11.3 | |
| 11 | 1 | 279–298 | ²382 | 204 | 2 | 71.7 | 36.7 | |
| 12 | 1 | 289 | ²353 | 199 | 14 | 73.4 | 57.5 | |
| 13 | 1 | 338–345 | 1,095 | 114 | 1 | 87.6 | 4.0 | 3.04 |
| 14 | 1 | 342–347 | 850 | 155 | 2 | 87.1 | 21.6 | 10.3 |
| 15 | 1 | 356 | 1,115 | 215 | 2 | 87.5 | 41.2 | 14.1 |
| 16 | 1.5 | 342–354 | ²688 | 200 | 2 | 82.6 | 33.0 | 17.1 |
| 17 | 2.0 | 349–356 | 1,115 | 208 | 2 | 82.5 | 35.2 | 17.1 |
| 18 | 3.0 | 356 | 850 | 197 | 2 | 79.7 | 26.4 | 37.0 |
| 19 | (⁴) | 347–356 | ²688 | 200 | 2 | 81.4 | 20.7 | 15.9 |
| 20 | (⁴) | 342–356 | 1,100 | 394 | 2 | 66.7 | 21.9 | 15.4 |
| 21 | (⁴) | 342–356 | | ³266 | 2 | 80.2 | 3.7 | 6.0 |

¹ The hydrogen fluoride was bubbled continuously through the hydrocarbon mixture.
² Pressures were calculated, not observed.
³ The catalyst was aqueous HF, 75% by weight.
⁴ Xylene alone was used as the feed stock.

It will be apparent that the operation may be varied, depending on the charging material and ultimate products desired. The preceding description illustrates one manner in which the process of our invention may be operated to produce toluene as the primary product.

If aromatic motor fuel is desired, all aromatic compounds boiling above the aviation gasoline boiling range (above about 325 F.) such as mesitylene, pseudocumene, diethylbenzene, durenes, etc., with or without benzene, are recycled through the reactor 3, while compounds in the desired boiling range as well as the heavy prod- From the above examples, it will be noted that high yields of toluene and higher methyl aromatic compounds are readily obtainable from xylene and benzene by disproportionation in the presence of liquid hydrogen fluoride. Especially significant is the fact that practically no tar is formed in these reactions. This is in marked contrast to the use of other agents in disproportionation processes wherein large proportions of the feed stock were consumed in the formation of undesirable by-products having a high carbon to hydrogen ratio, i. e., tars.

It is understood that the above examples are non-limitative, both as to the nature of the specific hydrocarbon charging stocks and as to the ratio in which they are used. Equimolal ratios of xylene and benzene were used in the above examples merely from the standpoint of convenience. Various other ratios of benzene to xylene may be used, for example from 0.1 to 10. Also, xylene may be disproportionated alone.

It will be seen that we have provided a novel and highly useful process for the disproportionation of alkyl aromatic hydrocarbons. We have also provided a cheap and very effective catalyst for the disproportionation of alkyl aromatic hydrocarbons, the said catalyst being distinguished by the convenience with which it may be used in liquid phase reaction systems and by the ease with which it may be recovered from the hydrocarbon reactants and reaction products so that it may be further used in the disproportionation process. Further, it will be apparent that we have provided an efficient and economical process for the disproportionation of alkyl aromatic hydrocarbons to produce valuable lower and higher boiling aromatic hydrocarbons, wherein the formation of undesirable tars and resins is almost wholly avoided. We have also provided a process for obtaining higher yields of blending stocks for aviation gasoline.

We claim:

1. A process for the disproportionation of methyl polycyclic aromatic hydrocarbons into higher and lower boiling aromatic hydrocarbons, comprising contacting said methyl polycyclic aromatic hydrocarbons with at least about 100 weight percent of a catalyst comprising principally hydrogen fluoride at a temperature sufficient to effect transfer of methyl groups to form higher and lower boiling homologs of said methyl polycyclic aromatic hydrocarbons.

2. A process for the disproportionation of methyl hydrocarbons into higher and lower boiling aromatic hydrocarbons comprising contacting said methyl aromatic hydrocarbons with at least about 100 weight per cent of a catalyst comprising princially hydrogen fluoride in a reaction zone at temperatures in the range 150° F. to 400° F. and under sufficient pressure to maintain the liquid phase.

3. A process for the disproportionation of methyl benzenes into higher and lower boiling aromatic hydrocarbons including the steps of contacting said methyl benzenes with at least about 100 weight percent of a catalyst comprising principally hydrogen fluoride in a reaction zone at temperatures in the range 150° F. to 400° F. and under sufficient pressure to maintain the liquid phase.

4. A process for the disproportionation of a mixture of methyl aromatic hydrocarbons having the general formula $ArR_n$, where Ar represents an aryl radical, R represents a methyl radical and $n$ is at least one, and a hydrocarbon selected from the group consisting of aromatic hydrocarbons and alkyl aromatic hydrocarbons having the general formula $ArR_{n-x}$, wherein Ar represents an aryl radical, R represents an alkyl radical, $n$ is at least one and $x$ is less than $n$, in the presence of at least about 100 weight percent of a catalyst comprising principally hydrogen fluoride in a reaction zone at a temperature sufficient to effect transfer of methyl groups to form higher and lower boiling homologs of said methyl aromatic hydrocarbons.

5. A process for the disproportionation of a mixture of methyl benzenes having the general formula $ArR_n$, wherein Ar represents a benzene radical, R represents a methyl radical and $n$ is at least one, and a hydrocarbon selected from the group consisting of aromatic hydrocarbons and alkyl aromatic hydrocarbons having the general formula $ArR_{n-x}$, wherein Ar represents an aryl radical, R represents an alkyl radical, $n$ is at least one and $x$ is less than $n$, in the presence of at least about 100 weight percent of a catalyst comprising principally hydrogen fluoride in a reaction zone at a temperature sufficient to effect transfer of methyl groups to form higher and lower boiling homologs of said methyl benzenes.

6. A process for the disproportionation of a mixture of methyl aromatic hydrocarbons having the general formula $ArR_n$, wherein Ar represents an aryl radical, R represents a methyl radical and $n$ is at least one, and benzene in the presence of at least 100 weight percent of hydrogen fluoride in a reaction zone, at temperatures of 150° F. to 400° F. and sufficient pressure to maintain the reactants and hydrogen fluoride in liquid phase.

7. A process for the disproportionation of a mixture of methyl benzenes having the general formula $ArR_n$, wherein Ar represents a benzene radical, R represents a methyl radical and $n$ is at least two, and benzene in the presence of at least 100 weight percent of hydrogen fluoride in a reaction zone at temperatures of 150° F. to 400° F. and sufficient pressure to maintain the reactants and hydrogen fluoride in liquid phase.

8. A process for the disproportionation of xylene comprising contacting a mixture of xylene and benzene with at least 100 weight percent of catalyst comprising principally hydrogen fluoride in a reaction zone at temperatures in the range 150° F. to 400° F. and under sufficient pressure to maintain the liquid phase.

9. A process for the disproportionation of xylene, comprising contacting a mixture of xylene and benzene with at least 100 weight percent of a catalyst comprising principally hydrogen fluoride in a reaction zone at temperatures in the range 150° F. to 400° F. and under sufficient pressure to maintain the liquid phase, and recovering toluene from the disproportionation products.

10. A process for the production of aviation gasoline comprising catalytically hydroforming paraffinic hydrocarbons, fractionating the hydroformate to produce a fraction comprising principally benzene and a fraction comprising principaly xylenes, and contacting said fractions with at least 100 weight percent of hydrogen fluoride at temperatures in the range 150° F. to 400° F. under sufficient pressure to maintain the liquid phase.

11. A process for the disproportionation of methyl benzenes comprising contacting said methyl benzenes with at least about 100 weight percent of a catalyst comprising principally hydrogen fluoride at a temperature sufficient to effect transfer of methyl groups to form higher and lower boiling homologs of said methyl benzenes.

12. A process for the disproportionation of methyl aromatic hydrocarbons comprising contacting said methyl aromatic hydrocarbons with at least about 100 weight per cent of a catalyst comprising principally hydrogen fluoride at a temperature sufficient to effect transfer of methyl groups to form higher and lower boiling homologs of said methyl aromatic hydrocarbons.

13. A process for the disproportionation of a xylene which comprises contacting a xylene with at least about 100 weight per cent of a catalyst comprising principally hydrogen fluoride under sufficient pressure to maintain the liquid phase and at a temperature sufficient to form higher and lower boiling homologs of said xylene.

14. A process for the disproportionation of a xylene into higher and lower boiling aromatic hydrocarbons which comprises contacting said xylene with at least about 100 weight per cent of a catalyst comprising principally hydrogen fluoride at a temperature in the range of 150° F. to 400° F. under sufficient pressure to maintain the liquid phase.

15. A process for the disproportionation of xylene comprising contacting a mixture of xylene and benzene with about 200 weight per cent of a catalyst comprising principally hydrogen fluoride under sufficient pressure to maintain the liquid phase at a temperature sufficient to form toluene, and recovering toluene from the disproportionation products.

16. A process for the disproportionation of xylene comprising contacting a mixture of xylene and benzene with about 200 weight per cent of a catalyst comprising principally hydrogen fluoride under sufficient pressure to maintain the liquid phase at a temperature in the range of 150° F. to 400° F. to form toluene, and recovering toluene from the disproportionation products.

ROBERT J. LEE.
HERSCHEL D. RADFORD.

REFERENCES CITED

The following references are of record in the file of this patent:

UNITED STATES PATENTS

| Number | Name | Date |
|---|---|---|
| 1,324,143 | Brooks | Dec. 9, 1919 |
| 2,010,948 | Egloff | Aug. 13, 1935 |
| 2,238,594 | Malishev | Apr. 15, 1941 |
| 2,257,920 | Sachanen et al. | Oct. 7, 1941 |
| 2,275,312 | Tinker et al. | Mar. 3, 1942 |
| 2,010,949 | Egloff | Aug. 13, 1935 |
| 2,372,320 | Frey | Mar. 27, 1945 |

OTHER REFERENCES

Simons, "Potential Use—Processes." Ind. and Eng. Chem 32: 181 (1940) 1 page. (Pat. Off. Lib. 260–671.)

Certificate of Correction

Patent No. 2,416,184.     February 18, 1947.

ROBERT J. LEE ET AL.

It is hereby certified that errors appear in the printed specification of the above numbered patent requiring correction as follows: Column 6, line 27, for "reacter" read *reactor*; column 9, line 41, claim 2, after the word "methyl" insert *aromatic*; and that the said Letters Patent should be read with these corrections therein that the same may conform to the record of the case in the Patent Office.

Signed and sealed this 29th day of April, A. D. 1947.

[SEAL]

LESLIE FRAZER,
*First Assistant Commissioner of Patents.* xylene which comprises contacting a xylene with at least about 100 weight per cent of a catalyst comprising principally hydrogen fluoride under sufficient pressure to maintain the liquid phase and at a temperature sufficient to form higher and lower boiling homologs of said xylene.

14. A process for the disproportionation of a xylene into higher and lower boiling aromatic hydrocarbons which comprises contacting said xylene with at least about 100 weight per cent of a catalyst comprising principally hydrogen fluoride at a temperature in the range of 150° F. to 400° F. under sufficient pressure to maintain the liquid phase.

15. A process for the disproportionation of xylene comprising contacting a mixture of xylene and benzene with about 200 weight per cent of a catalyst comprising principally hydrogen fluoride under sufficient pressure to maintain the liquid phase at a temperature sufficient to form toluene, and recovering toluene from the disproportionation products.

16. A process for the disproportionation of xylene comprising contacting a mixture of xylene and benzene with about 200 weight per cent of a catalyst comprising principally hydrogen fluoride under sufficient pressure to maintain the liquid phase at a temperature in the range of 150° F. to 400° F. to form toluene, and recovering toluene from the disproportionation products.

ROBERT J. LEE.
HERSCHEL D. RADFORD.

REFERENCES CITED

The following references are of record in the file of this patent:

UNITED STATES PATENTS

| Number | Name | Date |
|---|---|---|
| 1,324,143 | Brooks | Dec. 9, 1919 |
| 2,010,948 | Egloff | Aug. 13, 1935 |
| 2,238,594 | Malishev | Apr. 15, 1941 |
| 2,257,920 | Sachanen et al. | Oct. 7, 1941 |
| 2,275,312 | Tinker et al. | Mar. 3, 1942 |
| 2,010,949 | Egloff | Aug. 13, 1935 |
| 2,372,320 | Frey | Mar. 27, 1945 |

OTHER REFERENCES

Simons, "Potential Use—Processes." Ind. and Eng. Chem 32: 181 (1940) 1 page. (Pat. Off. Lib. 260–671.)

Certificate of Correction

Patent No. 2,416,184.      February 18, 1947.

ROBERT J. LEE ET AL.

It is hereby certified that errors appear in the printed specification of the above numbered patent requiring correction as follows: Column 6, line 27, for "reacter" read *reactor*; column 9, line 41, claim 2, after the word "methyl" insert *aromatic*; and that the said Letters Patent should be read with these corrections therein that the same may conform to the record of the case in the Patent Office.

Signed and sealed this 29th day of April, A. D. 1947.

[SEAL]

LESLIE FRAZER,
*First Assistant Commissioner of Patents.*